United States Patent [19]

Van der Floe et al.

[11] 3,777,267

[45] Dec. 4, 1973

[54] APPARATUS FOR SEARCHING FOR PEOPLE WHO ARE BURIED OR TRAPPED AND EQUIPPED WITH THE SAME TYPE OF APPARATUS

[75] Inventors: Hans Van der Floe, Selzach; Herbert Kully, Solothurn; Vacalv Stverak, Solothurn; Stephan Affolter, Solothurn, all of Switzerland

[73] Assignee: Autophan Aktiengesellschaft, Solothurn, Switzerland

[22] Filed: Dec. 18, 1972

[21] Appl. No.: 315,863

[30] Foreign Application Priority Data

Dec. 24, 1971 Switzerland ...................... 18895/71

[52] U.S. Cl. ..................... 325/18, 325/16, 325/186, 325/401, 340/15.5 GC

[51] Int. Cl. .......................................... H04b 1/40

[58] Field of Search ..................... 181/5 T; 325/15, 325/16, 18, 19, 21, 22, 186, 319, 492, 401; 340/15.5 GC

[56] References Cited

UNITED STATES PATENTS 2,039,663 5/1936 Robinson .......................... 325/401

*Primary Examiner*—Albert J. Mayer
*Attorney*—George F. Dvorak et al.

[57] ABSTRACT

Apparatus for searching and determining the location of a transmitter carried on a person buried or trapped by a landslide, cave-in, and the like wherein the apparatus consists of a single unit having a selectively operative transmitter stage portion and a selectively operable receiver stage portion, a portable power supply, the receiver having an antenna and an input circuit wherein the efficiency of the input circuit is selectively adjustable in step-like manner to at least two different values by utilization of a transistor along with an optional resistor interposed between the transistor and the antenna, an input amplifier for receiving and amplifying the input signal, a manually operative progressively adjustable attenuation damping element electrically connected to the input amplifier and the input circuit, a receiver oscillator having an output frequency different from the normal frequency of the receiver, the output signal from the receiver oscillator being fed into a mixing stage along with the signal from the attenuation damping amplifier being fed into the mixing stage for comparison and mixing of the two signals, the mixing stage output signal being fed to a filter stage for initial filtering, the output signal from the filter stage being fed to an amplifier stage for amplification and feeding through a control element to an earphone-type device for converting the electrical signal into an audio detectable signal, the attenuation damping element comprising a manually operable switch including at least two switch segments each having a plurality of corresponding contacts and switch positions, the number of switch positions for controlling the receiver exceeding the number of steps available for adjusting the attenuation damping element, some of the contacts of the first switch segment being electrically connected to the attenuation damping element for effecting adjustment of the damping element upon changing the switch to different switch positions, some of the contacts of the second switch segment being electrically connected to the input circuit for effecting the control voltage provided to the transistor for adjustably changing the efficiency of the input circuit, the two switch segments being manually interconnected and operative such that a different total damping effect is obtained for each different switch receiving position with the total damping effect being a function of the selected efficiency of the input circuit in combination with the selected adjustments of the damping element.

9 Claims, 1 Drawing Figure

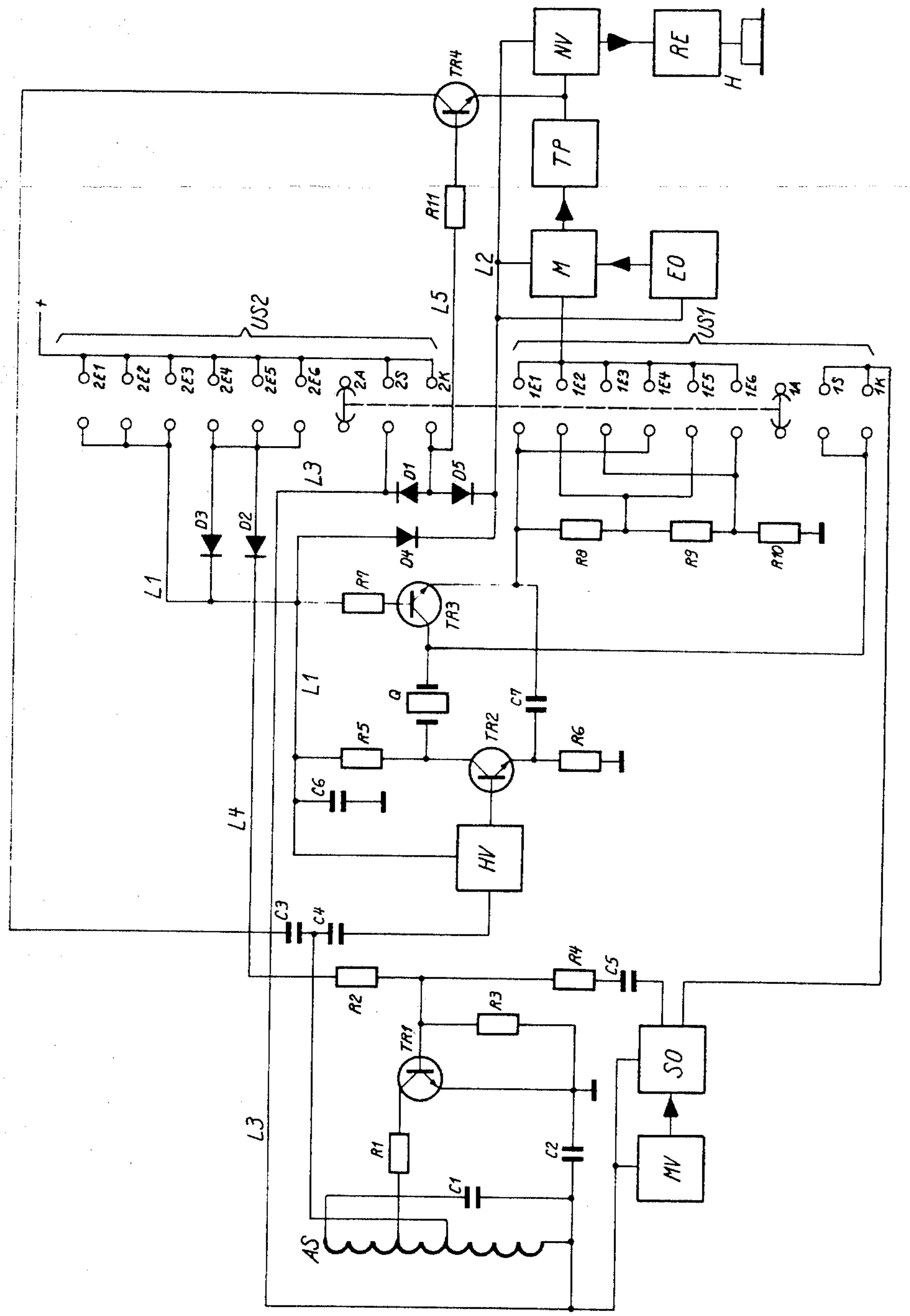
NV
RE
H
TR4
TP
R11
M
EO
L2
L5
US2
US1
2E1
2E2
2E3
2E4
2E5
2E6
2A
2S
2K
1E1
1E2
1E3
1E4
1E5
1E6
1A
1S
1K
L3
D1
D5
D3
D2
D4
R8
R9
R10
L1
R7
TR3
Q
C7
R5
TR2
R6
C6
L4
HV
C3
C4
R4
C5
R2
R3
TR1
SO
R1
C2
C1
MV
AS

APPARATUS FOR SEARCHING FOR PEOPLE WHO ARE BURIED OR TRAPPED AND EQUIPPED WITH THE SAME TYPE OF APPARATUS

BACKGROUND OF THE INVENTION

The present invention relates to an apparatus for searching for people who are buried or trapped alive by a landslide, cave-in, and the like and who are carrying the same type apparatus when trapped. Such an apparatus incorporates a selectively operative transmitter and receiver. Each person who is exposed to the danger of being trapped will carry one of these units with the transmitter being operative, while the same type of unit having the receiver rather than the transmitter operative, can be used to find trapped persons.

Commonly known types of units have a receiver comprising an antenna, an input circuit, an input amplifier, and receiver circuits. Because a receiver of this kind is supposed to be operative in a wide range of field signal intensity, a subdivision of the total operative range is required. In present type receivers this is ordinarily accomplished by a manually adjustable attenuator damping element where the sensitivity can be changed. In a known fashion, the efficiency of the input circuit may be increased by at least two values by means of at least one resistor included or excluded in the input circuit along with at least one transistor included in the input circuit. This prevents the overloading of the input amplifier when the input signal is very strong. However, in the presence of a very high field intensity, despite the best possible signal reduction, signals may be received by the input amplifier resulting in amplifier output signals too powerful for further processing in the following stages of the receiver. Since, however, the receiver must be able to discriminate field intensity differences even when very high field intensity exists, such as when the receiver is in close proximity to the transmitter, an adjustable attenuation damping element in the following receiver stages has to be added. However, if stepping type switches are utilized to manually change the efficiency of the input circuit, along with the additional manual adjustment required for the attenuation damping element, the operation of the receiver becomes quite complicated and cumbersome under the emergency conditions of attempting to locate a buried or trapped person.

SUMMARY OF THE INVENTION

The present invention permits adjustment of all combinations of input circuit efficiency along with all possible attenuation damping stages therefor to handle all varying conditions of field intensity levels, such overall adjustment being accomplished by means of a single switch.

The invention deals with a transmitter-receiver unit as set forth hereinabove with an input circuit adjustable to various efficiency levels and an adjustable attenuation damping element. This unit is characterized by a manually operable switch having at least two switch segments along with a number of receiving positions exceeding the number of steps of the attenuation damping element. A feature of the invention is that the first of the switching segments directly changes the level of the attentuation damping element, and the second of the switching segments directly changes the input voltage to a transistor in the input circuit to control the input circuit efficiency. The attenuation dampings adjusted with the two switching segments are tuned in such a way that when the switch is in one of the receiving positions, the total attenuation damping effect as determined by the quality of the input circuit and the stage of the attenuation damping element, is different in each position of the switch.

In one particular example of the invention, the above-mentioned manual switch also includes means to perform a functional check of the majority of all stages, when the transmitter and receiver are turned on and off, respectively, without additional expenditure for switching segments.

BRIEF DESCRIPTION OF THE DRAWING

The accompanying drawing shows for the purpose of exemplification, without limiting the invention or claims thereto, a preferred embodiment of the circuit diagram of the present invention in the form of a combined block type and schematic circuit diagram illustration.

DESCRIPTION OF THE PREFERRED EMBODIMENT

Referring to the drawing, there is shown an antenna coil AS of a ferrite antenna in parallel combination with a condenser C1 forming an input circuit tuned approximately to the same transmitter and receiver frequency. The primary input stage of the transmitter is designated as S0. A multi-vibrator MV is provided which intermittently turns on and off the primary stage S0 of the transmitter and, therefore, the whole transmitter. This amounts to a substantial savings of battery energy.

A manually operable switch is provided having two switch segments US1 and US2 connected to each other for simultaneous switching operation. Each switch segment is provided with 9 switch terminal positions designated generally as E1, E2, E3, E4, E5, E6, A, S, and K, it being understood that the terminals of switch segment US1 are each designated by the number 1 prefixing the terminal designation, with the terminals of switch segment US2 each designated by the number 2 prefixing the terminal designation. Further, it is understood that since the two switch segments US1, US2 are connected to each other, that US1 will always be in the same switch terminal position as US2 for each position of the switch.

One electrode of an oscillating frequency determining crystal Q is connected to the input stage S0 by terminal contacts 1S and 1K, with the other electrode of the crystal being connected to ground by a series connected resistor R5 and condenser C6. The signal created by the input stage S0 will be transmitted to the base of a transistor TR1 through a series connected condenser C5 and resistor R4. The base of transistor TR1 is also connected to the antenna coil AS through a series connected resistor R3 and condenser C2, with a part of the antenna coil placed between the collector and emitter of transistor TR1 by a resistor R1 and the condenser C2. The transistor TR1 functions as the output stage of the transmitter as long as it is controlled by the primary input stage S0. The transmitter stages are powered by a line L3.

From a tap of antenna coil AS a connection via a series connected condenser C4 leads to the input side of an input amplifier HV which is powered by a line L1. A transistor TR2, having a resistance R5 in the collector circuit and R6 in the emitter circuit respectively, and by means of the oscillating crystal Q and a condenser C7, delivers a voltage of opposite phase. This creates the terminal stage of input amplifier HV. As long as this input amplifier HV is being powered, the base of a switching transistor TR3 receives a voltage via a resistor R7 shifting this switching transistor TR3 into a conducting condition. One of the voltages of transistor TR2 reaches a resistor R8 via the oscillating crystal Q, while the voltage of the aforementioned opposite phase reaches resistor R8 via the condenser C7. With this circuit, the electrode capacity of oscillating crystal Q will be compensated, so that the circuit elements between the transistor TR2 and the resistor R8 act as a symmetrical crystal filter, whose output leads to the adjustable attenuation damping element of a series connection of resistors R8, R9 and R10. At the three junction points between these resistors forming the attenuation damping element, signals of three different intensities may be delivered.

Each of these junction points are connected with 2 selected terminals of the first segment US1 of the switch. The drawing shows the switch in a position connecting terminals A, referred to as switch position A for purposes of convenience. The output signal of the symmetrical crystal filter will reach the input terminal of a mixing stage M after being dampened more or less, depending on the switch position. In the switch positions E1, E2, E3 and E4, E5, E6, the damping value is the same, or in other words, the same damping value occurs at two different switch positions.

The mixing stage M receives a signal from a receiver oscillator E0 along with receiving the signal from the attenuation damping element. The signal from the receiver oscillator E0 is only slightly different from the receiver frequency, so that a low pass filter TP is adequate to filter the existing low frequency band. The filtered signal reaches a control element RE via a low frequency audio amplifier NV. The control element RE feeds a signal to an earphone H. The amplitude of this signal depends on the amplitude of low frequency amplifier NV. Each of the receiver stages, namely the mixing stage M, the receiver oscillator E0, the low frequency amplifier NV, and the control element RE are powered by feed line L2.

The positive terminal of the powering battery (not shown) is connected to switch segment US2 which in turn can selectively be connected to lines L1, L2, L3, L4 or L5. As already mentioned, these lines feed various stages of the apparatus or, by supplying control voltages to switching transistors, it will change these to conducting transistors. Some of these feed lines are connected directly to the terminal contacts of switch segment US2, some others are connected via the rectifying diodes D1, D2, D3, D4 and D5 to the terminal contacts of switch segment US2. These rectifying diodes assure that a certain feeder line can be supplied from various contacts, in other words, the feeder lines can be fed from various positions of the manually operable switch, without running the risk of having undesirable connections between certain lines. In indicated position A of the manually operable switch, the whole unit is turned off.

In switch position S, the transmitter, consisting of primary input stage SO, transistor TR1 functioning as the output stage, and multi-vibrator MV is turned on via terminal contact 2S and line L3. The receiver will be turned on by positioning the manually operable switch into one of the E switch positions. If it is positioned at E1, E2 or E3, then via contacts 2E1, 2E2, or 2E3 and line L1 the input amplifier HV including the output stage formed by transistor TR2 will be connected to a feeder voltage. Voltage directed through the resistor R7 changes transistor TR3 to a conducting condition and, via rectifier D4 and line L2, the remaining stages of the receiver will be supplied with a feeder voltage. As can be seen from previous explanations, the oscillating crystal Q is in a special position, since it functions alternately as a filter when receiving, and as a normal oscillator transmitting crystal determining transmitting frequency while transmitting. As mentioned before, switching involves switch segment US1 with terminal 1S when transmitting, and switching transistor TR3 controlled via terminal contact 1E of switch segment US2 when receiving.

The received signal will be transmitted in known fashion over oscillating crystal Q and the attenuating damping element to mixing stage M. In position E1 of the switch, the signal is not dampened, which means in this position the receiver is switched to its highest sensitivity. In switch positions E2 and E3, the feeder voltage remains the same, except for the tap at the voltage divider and, therefore, the damping between the input amplifier HV and the remaining part of the receiver will be changed. The receiver, in this case, is operating in less sensitive ranges.

In switch positions E4, E5 or E6, feeding happens via the rectifier D3, otherwise, it is the same as in switch positions E1, E2 or E3 respectively. In addition, the line L4 via rectifier D2 will receive a voltage which will switch the transistor TR2 into a conducting condition via the resistor R2. Since the emitter and collector of the transistor TR1 are connected to different points of the antenna coil AS, a shunt circuit to this coil exists over the resistor R1 and the condenser C2, thus reducing the efficiency of the input circuit HV and, therefore, dampening considerably the received signal of the antenna. This weakened signal will be transferred to the input amplifier HV. In other words, it means the receiver sensitivity will be reduced. By virtue of the further damping element, consisting of resistors R6, R9 and R10, the total damping effect will be increased even more. As mentioned previously, the damping effect of the second damping element is the same in switch positions E1 and E4, E2 and E5, E3 and E6. Choosing resistors R1, R8, and R10 in a suitable way, it is possible to make the damping effect of the circuit intensity greater than the greatest damping of the damping element. Therefore, an even stepping of the total damping effect is accomplished, which, in turn, means that the received field intensities are stepped in the same manner. It is apparent that additional steps can be added to the damping element than shown in this preferred embodiment, if desired. Only three step positions were chosen for the preferred embodiment to simplify the description. By adding more switching transistors into the input circuit, this also could increase the number of efficiency steps.

When the switch is in checking position *k*, a voltage is supplied over rectifier D1 to line L3, and also over rectifier D5 to line L2, and also over a resistor R11 to the base of a transistor TR4 such that the oscillating crystal Q will be connected to the transmitter. This means also a voltage is supplied for the transmitter and the mixing stage M, receiver oscillator E0, low frequency amplifier NV, and control element RE of the receiver.

When the transistor TR4 is in the conducting condition, part of the energy created by the antenna coil AS of the transmitter will be fed to the input of the low frequency audio amplifier NV via condenser C3. From here and the following stages of the receiver, the high frequency signal will be processed like a low frequency signal under normal conditions, so that the earphone H will be given a sound signal. In this way, operation of the transmitter can be checked as well as the receiver stages of the low frequency amplifier NV and the control element RE. Also in switch position K, the battery may be strained heavily affecting a breakdown of the supply voltage which leaves the transmitter inoperative and simultaneously allows a check on the condition of the battery.

In this preferred embodiment, therefore, it is possible to perform the following functions with a single manually operable switch having two interconnected switch segments, namely: turn the unit on and off; switch between a transmitting function and a receiving function; adjust the receiver to the best suited sensitivity range; and check the overall performance of the unit.

What is claimed is:

1. Apparatus for searching and determining the location of a transmitter carried on a person buried or trapped by a landslide, cave-in, and the like, the apparatus comprising a selectively operative transmitter stage and a selectively operative receiver stage; a power supply; the receiver including an antenna and an input circuit; the efficiency of the input circuit being selectively adjustable in intermittent steps to at least two different values by means of at least one transistor and at least one resistor selectively operable in the input circuit between the transistor and the antenna; an input amplifier; a manually operative progressively adjustable attenuation damping element connected to the input amplifier and the input circuit; a receiver oscillator having an output frequency different from the normal frequency of the receiver; a mixing stage in the receiver for receiving signals from the receiver oscillator and from the attenuation damping amplifier for comparing and mixing the signals; a filter stage connected to the mixing stage for filtering the output signal from the mixing stage; an amplifier stage connected to the filter stage for receiving and amplifying the output signal received from the filter stage; a control element connected to the amplifier for receiving and controlling the output signal from the amplifier stage; an electrically powered audio device connected to the control element for receiving the output signal therefrom and converting it into corresponding audio signals; the attenuation damping element comprising a manually operable switch including at least two switch segments each having a plurality of corresponding contacts and switch positions, the number of switch positions for controlling the receiver exceeding the number of steps available for adjusting the attenuation damping element, the first switch segment having some of its contacts electrically connected to the attenuation damping element such that operation of the switch to change switch positions directly effects the adjustment of the attenuation damping element, the second switch segment having some of its contacts electrically connected to the input circuit for switching and controlling the control voltage provided to the transistor for adjustably changing the efficiency of the input circuit; such that a different total damping effect is obtained at each different switch receiving position, the total damping effect being a function of the selected efficiency of the input circuit in combination with the selected adjustment of the damping element.

2. Apparatus as claimed in claim 1 further comprising positions on the switch connected to power feed circuits of the transmitter stage and receiver stage for turning the power on and off to the various circuits.

3. Apparatus as claimed in claim 1 further comprising an oscillating crystal connected to the input amplifier and adapted for alternate utilization by both the transmitter and the receiver stages, and at least one switching transistor having its control voltage controlled by the positions of the switch for cooperating in switching the modes of operation of the oscillating crystal between the transmitter operation and the receiver operation.

4. Apparatus as claimed in claim 1 further comprising at least one switching transistor having its emitter and collector connected between the antenna and the input of the amplifier stage of the receiver so that when the transistor is switched into a conducting condition it is possible for the person operating the apparatus to check that both the transmitter and amplifier stage of the receiver are working when the transmitter and the amplifier stage of the receiver are turned on.

5. Apparatus as claimed in claim 2 wherein the switch is provided with a plurality of positions for controlling the receiver, a position for controlling the transmitter, a position for checking the operation of the transmitter and receiver, and an on-off position, the manual switch exclusively containing the first and second switch segments, the second switch segment having rectifier circuits associated therewith for controlling the feeding of voltages partially via the rectifiers to various parts of the receiver stages and transmitter stages, the second switch segment also feeding a control voltage to a plurality of switching transistors, such that at least some of the contacts of the second switch segment are feeding a voltage simultaneously to more than a single stage of the apparatus.

6. Apparatus as claimed in claim 4 wherein the switch is provided with a plurality of positions for controlling the receiver, a position for controlling the transmitter, a position for checking the operation of the transmitter and receiver, and an on-off position, the manual switch exclusively containing the first and second switch segments, the second switch segment having rectifier circuits associated therewith for controlling the feeding of voltages partially via the rectifiers to various parts of the receiver stages and transmitter stages, the second switch segment also feeding a control voltage to a plurality of switching transistors, such that at least some of the contacts of the second switch segment are feeding a voltage simultaneously to more than a single stage of the apparatus.

7. Apparatus as claimed in claim 1 wherein the antenna includes an antenna coil common to both the transmitter and receiver, an output stage of the transmitter utilizing the transistor in the receiver input circuit, the transistor having its collector and emitter connected to two different points of the antenna coil such that the transistor serves to change the efficiency of the input circuit when the transmitter is turned off and the receiver is turned on.

8. Apparatus as claimed in claim 5 further comprising an oscillating crystal electrically connected to the transmitter via the first switch segment when the switch is in a position for transmitting or in a position for checking the operation of the apparatus.

9. Apparatus as claimed in claim 6 further comprising an oscillating crystal electrically connected to the transmitter via the first switch segment when the switch is in a position for transmitting or in a position for checking the operation of the apparatus.

* * * * *